(12) United States Patent
Yamazaki et al.

(10) Patent No.: US 10,190,219 B2
(45) Date of Patent: Jan. 29, 2019

(54) ELECTRICAL STEEL SHEET

(71) Applicant: NIPPON STEEL & SUMITOMO METAL CORPORATION, Tokyo (JP)

(72) Inventors: Shuichi Yamazaki, Tokyo (JP); Masaru Takahashi, Tokyo (JP); Kazutoshi Takeda, Tokyo (JP); Hiroyasu Fujii, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/532,357

(22) PCT Filed: Dec. 21, 2015

(86) PCT No.: PCT/JP2015/085643
§ 371 (c)(1),
(2) Date: Jun. 1, 2017

(87) PCT Pub. No.: WO2016/104407
PCT Pub. Date: Jun. 30, 2016

(65) Prior Publication Data
US 2017/0342568 A1 Nov. 30, 2017

(30) Foreign Application Priority Data

Dec. 26, 2014 (JP) .................. 2014-266747

(51) Int. Cl.
| | |
|---|---|
| C23C 22/20 | (2006.01) |
| C23C 22/08 | (2006.01) |
| C23C 22/22 | (2006.01) |
| C23C 22/74 | (2006.01) |
| B32B 15/04 | (2006.01) |
| B32B 15/18 | (2006.01) |
| C23C 22/12 | (2006.01) |

(52) U.S. Cl.
CPC .............. C23C 22/20 (2013.01); B32B 15/04 (2013.01); B32B 15/18 (2013.01); C23C 22/08 (2013.01); C23C 22/12 (2013.01); C23C 22/22 (2013.01); C23C 22/74 (2013.01)

(58) Field of Classification Search
CPC ......... C23C 22/08; C23C 22/20; C23C 22/22; C23C 22/74; C23C 22/00; C23C 22/12; B32B 15/18; B32B 15/04
See application file for complete search history.

(56) References Cited

U.S. PATENT DOCUMENTS

| | | | |
|---|---|---|---|
| 3,856,568 A | 12/1974 | Tanaka et al. | |
| 5,945,212 A | 8/1999 | Tanaka et al. | |
| 2009/0208764 A1* | 8/2009 | Tanaka ............... | C23C 22/08 428/472.2 |
| 2009/0233114 A1 | 9/2009 | Takeda et al. | |
| 2013/0209789 A1 | 8/2013 | Takeda et al. | |

FOREIGN PATENT DOCUMENTS

| | | |
|---|---|---|
| JP | 53-28375 B2 | 8/1978 |
| JP | 5-78855 A | 3/1993 |
| JP | 6-330338 A | 11/1994 |
| JP | 9-209165 A | 8/1997 |
| JP | 11-131250 A | 5/1999 |
| JP | 11-152579 A | 6/1999 |
| JP | 2001-107261 A | 4/2001 |
| JP | 2001-220683 A | 8/2001 |
| JP | 2002-47576 A | 2/2002 |
| JP | 2002-249881 A | 9/2002 |
| JP | 2002-317277 A | 10/2002 |
| JP | 2008-303411 A | 12/2008 |
| JP | 2013-249486 A | 12/2013 |
| WO | WO 2012/057168 A1 | 5/2012 |

OTHER PUBLICATIONS

International Search Report for PCT/JP2015/085643 dated Mar. 22, 2016.
Written Opinion of the International Searching Authority for PCT/JP2015/085643 (PCT/ISA/237) dated Mar. 22, 2016.
International Preliminary Report on Patentability and English translation of the Written Opinion of the International Searching Authority (Forms PCT/IB/338, PCT/IB/373 and PCT/ISA/237), dated Jul. 6, 2017, for International Application No. PCT/JP2015/085643.
Extended European Search Report dated Jun. 6, 2018 for corresponding EP Patent Application No. 15872975.6.

* cited by examiner

Primary Examiner — Humera N Sheikh
Assistant Examiner — Elizabeth Collister
(74) Attorney, Agent, or Firm — Birch, Stewart, Kolasch & Birch, LLP

(57) ABSTRACT

An electrical steel sheet (1) includes a base material (2) of electrical steel, and an insulating film (3) formed on a surface of the base material (2). The insulating film (3) contains a phosphate of one or more selected from the group consisting of Al, Zn, Mg and Ca. A proportion of an amount by mole (mol) of Fe atoms relative to an amount by mole (mol) of P atoms in the insulating film (3) is more than 0.1 but not more than 0.65.

2 Claims, 3 Drawing Sheets

1.0%

0.3%

0.1%

0.03%

0.01%

ELECTRICAL STEEL SHEET

TECHNICAL FIELD

The present invention relates to an electrical steel sheet.

BACKGROUND ART

An electrical steel sheet is used or transported under a corrosive environment. For example, the electrical steel sheet is used in hot and humid regions or transported by sea. During the transportation by sea, a large amount of salt comes flying. Therefore, the electrical steel sheet is required to have rust resistance. To obtain the rust resistance, an insulating film is formed on the surface of the electrical steel sheet. An example of the insulating film is a chromite-based insulating film. Though the chromite-based insulating film exhibits good rust resistance, hexavalent chromium used as the raw material of the chromite-based insulating film is carcinogenic. Therefore, it is required to develop an insulating film that can be formed without using hexavalent chromium as a raw material.

Examples of the insulating film that can be formed without using hexavalent chromium as a raw material include a phosphate-based insulating film, a silica-based insulating film, and a zirconium-based insulating film (PATENT LITERATURES 1 to 12). However, with these insulating films, the rust resistance at the same level as that of the chromite-based insulating film cannot be obtained. Though the rust resistance is improved by thickening the insulating film, the weldability and the caulking property decrease more with a thicker insulating film.

CITATION LIST

Patent Literature

Patent Literature 1: Japanese Examined Patent Application Publication No. 53-028375
Patent Literature 2: Japanese Laid-open Patent Publication No. 05-078855
Patent Literature 3: Japanese Laid-open Patent Publication No. 06-330338
Patent Literature 4: Japanese Laid-open Patent Publication No. 11-131250
Patent Literature 5: Japanese Laid-open Patent Publication No. 11-152579
Patent Literature 6: Japanese Laid-open Patent Publication No. 2001-107261
Patent Literature 7: Japanese Laid-open Patent Publication No. 2002-047576
Patent Literature 8: International Publication Pamphlet No. 2012/057168
Patent Literature 9: Japanese Laid-open Patent Publication No. 2002-47576
Patent Literature 10: Japanese Laid-open Patent Publication No. 2008-303411
Patent Literature 11: Japanese Laid-open Patent Publication No. 2002-249881
Patent Literature 12: Japanese Laid-open Patent Publication No. 2002-317277

SUMMARY OF INVENTION

Technical Problem

An object of the present invention is to provide an electrical steel sheet capable of obtaining good rust resistance without using hexavalent chromium as a raw material of an insulating film.

Solution to Problem

The present inventors earnestly studied to solve the above problem. As a result, it has been revealed that good rust resistance is obtained when a relation between an amount by mole of P and an amount by mole of Fe contained in the insulating film is specific. It has also been revealed that use of a coating solution containing a chelating agent is important for forming the insulating film.

The present inventors have reached the aspects of the present invention described below as a result of further earnest studies based on the above findings.

(1)
An electrical steel sheet, including:
a base material of electrical steel; and
an insulating film formed on a surface of the base material,
wherein the insulating film contains a phosphate of one or more selected from the group consisting of Al, Zn, Mg and Ca, and
wherein a proportion of an amount by mole (mol) of Fe atoms relative to an amount by mole (mol) of P atoms in the insulating film is more than 0.1 nor more than 0.65.

(2)
The electrical steel sheet according to (1), wherein the insulating film contains an organic resin.

Advantageous Effects of Invention

According to the present invention, good rust resistance can be obtained without using hexavalent chromium as the raw material of the insulating film because a relation between an amount by mole of P and an amount by mole of Fe contained in the insulating film is specific. This can avoid a decrease in weldability and caulking property accompanying an increase in thickness of the insulating film.

DESCRIPTION OF EMBODIMENT

Figure 1:
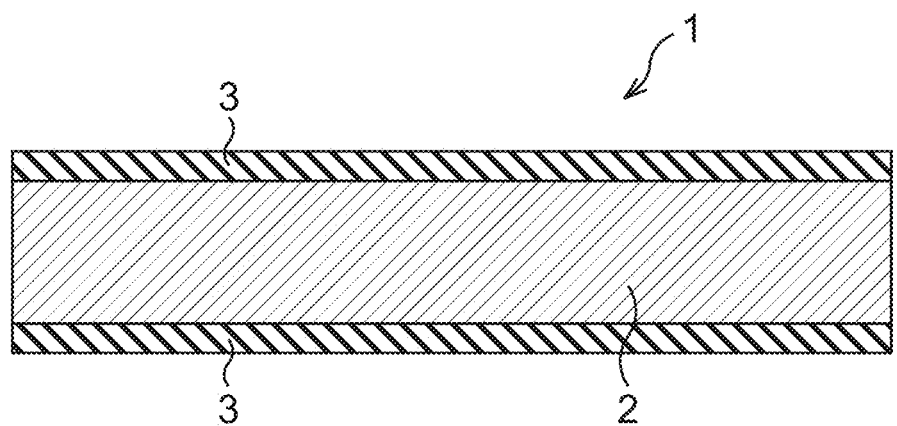
FIG. 1 is a cross-sectional view illustrating a structure of an electrical steel sheet according to an embodiment of the present invention.

Hereinafter, an embodiment of the present invention will be described in detail referring to the accompanying drawings. FIG. 1 is a cross-sectional view illustrating a structure of an electrical steel sheet according to the embodiment of the present invention.

As illustrated in FIG. 1, an electrical steel sheet 1 according to the embodiment of the present invention includes a base material 2 of electrical steel and an insulating film 3 formed on a surface of the base material 2. The base material 2 includes a composition suitable for a grain-oriented electrical steel sheet or a non-oriented electrical steel sheet.

The insulating film 3 contains a phosphate of one or more selected from the group consisting of Al, Zn, Mg and Ca. The proportion of the amount by mole (mol) of Fe atoms relative to the amount by mole (mol) of P atoms in the insulating film 3 is more than 0.1 nor more than 0.65. Hereinafter, "Fe/P molar ratio" sometimes denotes the proportion of the amount by mole (mol) of Fe atoms relative to the amount by mole (mol) of P atoms, and M sometimes denotes Al, Zn, Mg or Ca or any combination thereof.

The insulating film 3 having the above Fe/P molar ratio is denser and has better rust resistance than an insulating film included in a conventional electrical steel sheet. Therefore, according to the electrical steel sheet 1, good rust resistance can be obtained without decreasing the weldability and the caulking property without using hexavalent chromium as the raw material of the insulating film 3.

With a higher Fe/P molar ratio, the insulating film 3 exhibits better water resistance, and when the Fe/P molar ratio is 0.1 or less, sufficient water resistance cannot be obtained. Therefore, the Fe/P molar ratio is more than 0.1. On the other hand, when the Fe/P molar ratio is more than 0.65, the insulating film 3 is likely to be cracked, and water sometimes enters from the crack. Therefore, the Fe/P molar ratio is 0.65 or less.

The Fe/P molar ratio can be identified as follows for instance. The electrical steel sheet is immersed, for example, in a NaOH aqueous solution at a temperature of 80° C. and a concentration of 20 mass % for 30 minutes to dissolve the insulating film in the NaOH aqueous solution. Each of the amounts by mole (mol) of Fe and P contained in the NaOH aqueous solution is determined in quantity by the inductively coupled plasma (ICP) analysis. The Fe/P molar ratio of the insulating film is calculated from the amounts by mole.

Next, a method of manufacturing the electrical steel sheet 1 will be described. This method includes applying a coating solution composed of an M-containing polyvalent metal phosphate, a chelating agent and water to the base material of the electrical steel, and baking the coating solution. Water with a total concentration of Ca ions and Mg ions of 100 ppm or less is used as the water in the coating solution. Examples of the polyvalent metal phosphate include an aluminum monophosphate, a zinc monophosphate, a magnesium monophosphate, and a calcium monophosphate. Hereinafter, an aluminum phosphate, a zinc phosphate, a magnesium phosphate, and a calcium phosphate represent the aluminum monophosphate, the zinc monophosphate, the magnesium monophosphate, and the calcium monophosphate respectively.

In baking the coating solution, the ends of the phosphate are crosslinked by the dehydration/condensation reaction to form an insulating film. Examples of the reaction formula of the dehydration/condensation reaction include the followings. The chelating agent is described as "HO—R—OH".

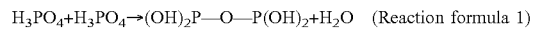

$$H_3PO_4 + H_3PO_4 \rightarrow (OH)_2P-O-P(OH)_2 + H_2O \quad \text{(Reaction formula 1)}$$

$$H_3PO_4 + Fe \rightarrow FePO_3 + H_2O \quad \text{(Reaction formula 2)}$$

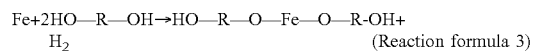

$$Fe + 2HO-R-OH \rightarrow HO-R-O-Fe-O-R-OH + H_2 \quad \text{(Reaction formula 3)}$$

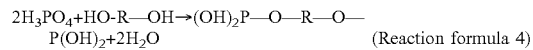

$$2H_3PO_4 + HO-R-OH \rightarrow (OH)_2P-O-R-O-P(OH)_2 + 2H_2O \quad \text{(Reaction formula 4)}$$

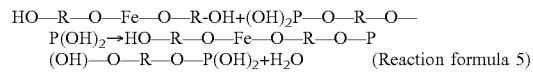

$$HO-R-O-Fe-O-R-OH + (OH)_2P-O-R-O-P(OH)_2 \rightarrow HO-R-O-Fe-O-R-O-P(OH)-O-R-O-P(OH)_2 + H_2O \quad \text{(Reaction formula 5)}$$

As described above, when the coating solution not containing the chelating agent is used, the crosslinking reaction of the phosphates of Reaction formula 1 alone and the dissolution reaction of iron by the phosphate of Reaction formula 2 occur. When the coating solution containing the chelating agent is used, the reaction between the chelating agent and iron of Reaction formula 3, the crosslinking reaction of the phosphate capturing the chelating agent of Reaction formula 4, and the crosslinking reaction of the phosphate capturing iron and the chelating agent of Reaction formula 5 occur instead of Reaction formula 2. A crosslinked structure of the phosphate due to the reactions of Reaction formula 3 to Reaction formula 5 makes the insulating film denser to improve the rust resistance.

As the chelating agent, for example, an oxycarbonic acid-based, dicarboxylic acid-based or phosphonic acid-based chelating agent is used. Examples of the oxycarbonic acid-based chelating agent include a malic acid, a glycolic acid and a lactic acid. Examples of the dicarboxylic acid-based chelating agent include an oxalic acid, a malonic acid and a succinic acid. Examples of the phosphonic acid-based chelating agent include an aminotrimethylene phosphonic acid, a hydroxyethylidene monophosphoric acid, and a hydroxyethylidene diphosphonic acid.

The amount of the chelating agent contained in the coating solution is 1 mass % to 30 mass % relative to the mass of the insulating film after baking. When the amount of the chelating agent is less than 1 mass %, a large amount of not-crosslinked $FePO_3$ is generated by the reaction of Reaction formula 2, the Fe/P molar ratio is more than 0.65, so that the rust resistance deteriorates due to cracking of the insulating film. When the amount of the chelating agent is 1 mass % or more, the crosslinking reactions of Reaction formula 3 to Reaction formula 5 proceed to make the insulating film denser, improving the rust resistance. Accordingly, the amount of the chelating agent is 1 mass % or more relative to the mass of the insulating film after baking. On the other hand, when the amount of the chelating agent is more than 30 mass %, passivation of the surface of the base material occurs due to the chelating agent to suppress the reaction of Reaction formula 3, resulting in an Fe/P molar ratio of less than 0.1, so that the crosslinked structure capturing Fe does not develop. Accordingly, the amount of the chelating agent is 30 mass % or less relative to the mass of the insulating film after baking.

The chelating agent is an active compound but, once reacted with metal, becomes stable in terms of energy and does not exhibit sufficient activity any longer. Accordingly, to keep the activity of the chelating agent high, metal other than the metal contained in the phosphate is prevented from reacting with the chelating agent before the baking of the coating solution is completed. Therefore, it is preferable that the concentration of metal ions having high reactivity with the chelating agent in water is low. Examples of the metal ion include a Ca ion and a Mg ion. When the total concentration of the Ca ions and the Mg ions is more than 100 ppm, the activity of the chelating agent decreases. Therefore, the total concentration of the Ca ions and the Mg ions is 100 ppm or less, and more preferably 70 ppm or less. A smaller amount of alkaline-earth metal ions other than the Ca ions and the Mg ions is more preferable.

The chelating agent contains a hydroxyl group at an end, and is likely to take an association state (hydrogen bond) expressed by Reaction formula 6.

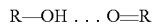 (Reaction formula 6)

When the degree of association (degree of hydrogen bond) of the hydroxyl group in the chelating agent increases, the crosslinking reactions expressed by Reaction formula 3 to Reaction formula 5 hardly occur. Therefore, the application of the coating solution is preferably performed to make the degree of association as low as possible. For example, in the case of performing application using a roller (roll coating), it is preferable to apply the coating solution while giving a shear stress to the coating solution to decrease the degree of association of the chelating agent. Decreasing the diameter of the roller and increasing the moving speed of the base material can give the shear stress suitable for releasing the association state. For example, it is preferable to use a roller having a diameter of 700 mm or less and set the moving speed of the base material to 60 m/min or more, and more preferable to use a roller having a diameter of 500 mm or less and set the moving speed of the base material to 70 m/min or more.

The baking of the coating solution is performed at a temperature of 250° C. or higher, the heating rate (first heating rate) from the temperature of the base material at the application, for example, the room temperature of about 30° C., to 100° C. is 8° C./sec or more, and the heating rate (second heating rate) from 150° C. to 250° C. is lower than the first heating rate. The temperature at the application is substantially equal to the temperature of the coating solution.

The progress of the above-described association of the chelating agent occurs no longer if the flowability of the coating solution is lost. Accordingly, to make the degree of association as low as possible, it is preferable to increase the first heating rate up to the boiling point of water (100° C.). When the first heating rate is less than ° C./sec, the degree of association of the chelating agent rapidly increases during temperature increase to make the crosslinking reactions expressed by Reaction formula 3 to Reaction formula 5 hardly occur. Therefore, the first heating rate is 8° C./sec or more.

The crosslinking reactions between the phosphate and the chelating agent of Reaction formula 1 and Reaction formula 3 to Reaction formula 5 and the decomposition of the chelating agent occur in a temperature range of 150° C. to 250° C. Therefore, by decreasing the second heating rate from 150° C. to 250° C., it is possible to accelerate the crosslinking reactions while suppressing the decomposition of the chelating agent. The crosslinking reactions using the chelating agent are affected by the above-described degree of association of the chelating agent. Accordingly, when the first heating rate is high and the degree of association of the chelating agent is low, the reactions of Reaction formula 3 to Reaction formula 5 can be accelerated even if the second heating rate is increased. In contrast to the above, when the first heating rate is low and the degree of association of the chelating agent is high, the reactions of Reaction formula 3 to Reaction formula 5 cannot be made to sufficiently proceed unless the second heating rate is decreased. From the study by the present inventors, it has been revealed that when the first heating rate is 8° C./sec or more and the second heating rate is lower than the first heating rate, the reactions of Reaction formula 3 to Reaction formula 5 proceed according to the degree of association of the chelating agent and good rust resistance can be obtained. However, when the second heating rate is extremely high, for example, more than 18° C./sec, the reactions of Reaction formula 3 to Reaction formula 5 are unlikely to proceed even when the first heating rate is 8° C./sec or more, so that good rust resistance cannot be obtained. Accordingly, the second heating rate is ° C./sec or less. On the other hand, with a lower second heating rate, the productivity becomes lower, which is remarkable at less than 5° C./sec. Accordingly, the second heating rate is preferably ° C./sec or more.

The electrical steel sheet 1 can be manufactured through the application of the coating solution to the base material of the electrical steel and baking of the coating solution.

The coating solution may contain an organic resin. The organic resin contained in the coating solution has an action of suppressing abrasion of a punching die. Therefore, use of the coating solution containing the organic resin improves the punching workability of the electrical steel sheet. The organic resin is preferably used as a water-dispersible organic emulsion. In the case where the water-dispersible organic emulsion is used, it is more preferable that less alkaline-earth metal ions such as Ca ions, Mg ions are contained therein. Examples of the organic resin include an acrylic resin, an acrylic styrene resin, an alkyd resin, a polyester resin, a silicone resin, a fluorocarbon resin, a polyolefin resin, a styrene resin, a vinyl acetate resin, an epoxy resin, a phenol resin, an urethane resin, and a melamine resin.

Next, the action of the chelating agent will be described.

When the coating solution not containing the chelating agent is used to form the insulating film, the phosphate and the chelating agent extremely react to result in an Fe/P molar ratio of more than 0.65. As described above, when the Fe/P molar ratio is more than 0.65, the insulating film is likely to be cracked. On the other hand, use of the coating solution containing a corrosion inhibitor can suppress the above reaction, but in this case the Fe/P molar ratio becomes 0.1 or less, so that sufficient water resistance cannot be obtained.

In contrast to the above, when the insulating film is formed using the coating solution containing the chelating agent, a compound of Fe and the chelating agent is formed in a relatively low temperature range at an initial stage of baking, thereafter the compound is decomposed in a relatively high temperature range, and Fe is captured in the insulating film. Fe captured in the insulating film contributes to improvement in rust resistance.

Here, a method of evaluating the rust resistance will be described.

Examples of the test of evaluating the rust resistance of the electrical steel sheet include the humidity cabinet test defined in JIS K 2246 and the salt spray test defined in JIS Z 2371. However, since the corrosive environments in these tests are greatly different from the corrosive environment where the electrical steel sheet rusts, the rust resistance of the electrical steel sheet cannot be appropriately evaluated by these tests.

Hence, the present inventors studied the method capable of appropriately evaluating the rust resistance in the corrosive environment where the electrical steel sheet rusts. As a result, it has been found that the following method can appropriately evaluate the rust resistance. In this method, liquid droplets of sodium chloride solutions different in concentration are attached by 0.5 μl to the surface of the electrical steel sheet having the insulating film and dried, and the electrical steel sheet is held in an atmosphere with constant temperature and humidity of a temperature of 50° C. and a relative humidity RH of 90% for 48 hours. A thermo-hygrostat may be used. Thereafter, the presence or absence of rust is observed, and the concentration of the sodium chloride solution with which the electrical steel sheet does not rust is identified. The rust resistance is evaluated based on the concentration of the sodium chloride solution with which the rust does not form.

More specifically, in this method, after the attachment and drying of the liquid droplets of the sodium chloride solutions, the electrical steel sheet is exposed to a moist atmosphere. Such process is similar to a corrosive environment to which the electrical steel sheet is exposed. In the corrosive environment, salt adheres to the surface of the electrical steel sheet during storage, transportation and use and then the salt deliquesces due to an increase in humidity. With a higher concentration of the sodium chloride solution, a larger amount of sodium chloride remains after drying and the rust is more likely to form. Accordingly, by making an observation while decreasing stepwise the concentration of the sodium chloride solution, and specifying the concentration where the rust does not form (hereinafter, sometimes referred to as a "limit sodium chloride concentration"), the rust resistance in the corrosive environment to which the electrical steel sheet is actually exposed can be quantitatively evaluated based on the limit sodium chloride concentration.

Figure 2A:
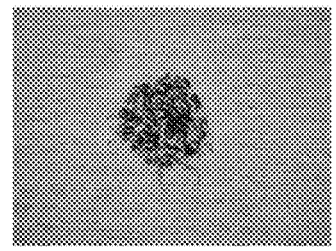
FIG. 2A is a view illustrating an example of a test result of rust resistance when a concentration of sodium chloride was 1.0 mass %.
Figure 2B:
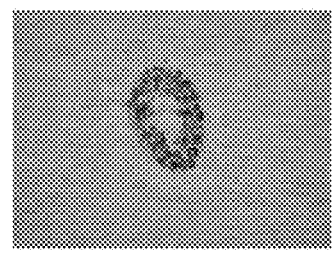
FIG. 2B is a view illustrating an example of a test result of rust resistance when a concentration of sodium chloride was 0.3 mass %.
Figure 2C:
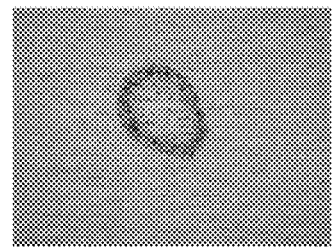
FIG. 2C is a view illustrating an example of a test result of rust resistance when a concentration of sodium chloride was 0.1 mass %.
Figure 2D:
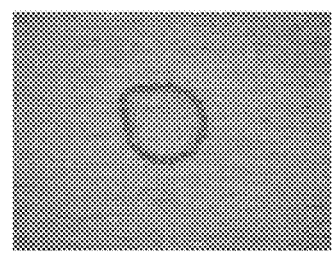
FIG. 2D is a view illustrating an example of a test result of rust resistance when a concentration of sodium chloride was 0.03 mass %.
Figure 2E:
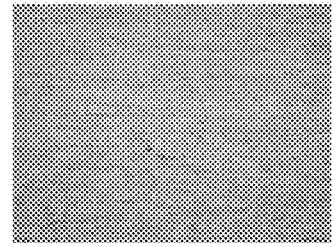
FIG. 2E is a view illustrating an example of a test result of rust resistance when a concentration of sodium chloride was 0.01 mass %.

FIG. 2A to FIG. 2E illustrate examples of the test result by the above method. In this test, the concentration of sodium chloride was 1.0 mass % (FIG. 2A), 0.3 mass % (FIG. 2B), 0.1 mass % (FIG. 2C), 0.03 mass % (FIG. 2D), or 0.01 mass % (FIG. 2E). As illustrated in FIG. 2A to FIG. 2E, rust was observed when the concentration of the sodium chloride was 1 mass %, 0.3 mass %, 0.1 mass %, or 0.03 mass %, and rust was not observed when the concentration of the sodium chloride was 0.01 mass %. Therefore, the limit sodium chloride concentration of the electrical steel sheet is 0.01 mass %. The present inventors have confirmed that the rusting state rarely changes even when the hold time in the atmosphere with constant temperature and humidity is over 48 hours.

Figure 3A:
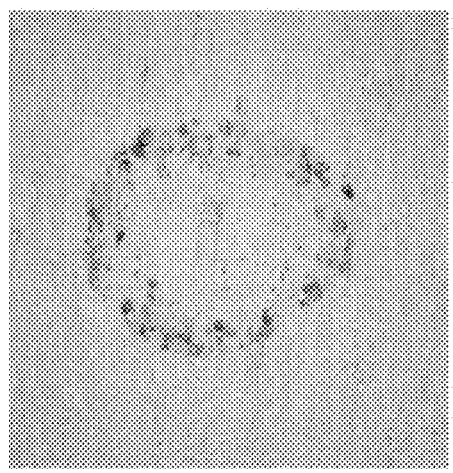
FIG. 3A is a view illustrating an example of a test result of rust resistance when an insulating film was formed using a coating solution not containing a chelating agent.
Figure 3B:
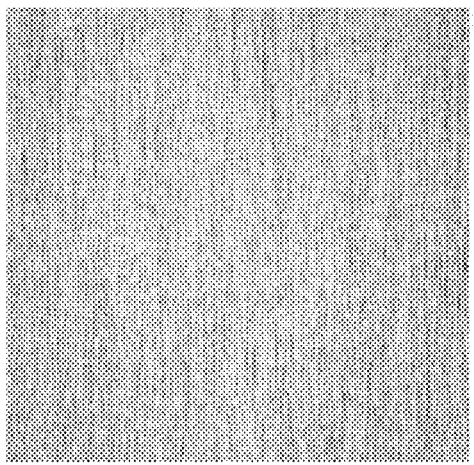
FIG. 3B is a view illustrating an example of a test result of rust resistance when an insulating film was formed using a coating solution containing a chelating agent.

FIG. 3A illustrates an example of a test result by the above method about the electrical steel sheet having the insulating film formed using the coating solution not containing the chelating agent, and FIG. 3B illustrates an example of a test result by the above method about the electrical steel sheet having the insulating film formed using the coating solution containing the chelating agent. Each of the coating solutions contains the aluminum phosphate as the polyvalent metal phosphate. On the electrical steel sheet having the insulating film formed using the coating solution not containing the chelating agent, rust was observed in the case of using the sodium chloride solution having a concentration of 0.03 mass % as illustrated in FIG. 3A. On the other hand, on the electrical steel sheet having the insulating film formed using the coating solution containing the chelating agent, no rust was observed even in the case of using the sodium chloride solution having a concentration of 0.2 mass % as illustrated in FIG. 3B.

As described above, the limit sodium chloride concentration is higher and better rust resistance can be obtained in the case of forming the insulating film using the coating solution containing the chelating agent than in the case of forming the insulating film using the coating solution not containing the chelating agent.

Further, the insulating film 3 according to the embodiment of the present invention has an Fe/P molar ratio of more than 0.1 nor more than 0.65. Therefore, good rust resistance can be obtained without using hexavalent chromium as the raw material of the insulating film 3 by the electrical steel sheet 1. For example, the electromagnetic steel sheet 1 exhibits sufficient rust resistance even under a high airborne salt environment during transportation by sea or the like or under a hot and humid environment corresponding to the subtropical zone or the tropical zone. Since the insulating film 3 does not need to be formed thick, a decrease in weldability and caulking property can be avoided.

It should be noted that the above embodiment merely illustrate concrete examples of implementing the present invention, and the technical scope of the present invention is not to be construed in a restrictive manner by the embodiment. That is, the present invention may be implemented in various forms without departing from the technical spirit or main features thereof.

EXAMPLES

Next, examples of the present invention will be described. The condition in examples is one condition example employed for confirming the feasibility and the effect of the present invention, and the present invention is not limited to the one condition example. The present invention can employ various conditions without departing from the scope of the present invention and within achieving the object of the present invention.

The present inventors prepared coating solutions each composed of phosphate, a chelating agent, an organic resin and water listed in Table 1 and applied to both surfaces of a base material of electrical steel and baked. The total concentration (total ion concentration) of Ca ions and Mg ions contained in the water is also listed in Table 1. The application condition and the baking condition are also listed in Table 1. The first heating rate is the heating rate from 30° C. to 100° C., and the second heating rate is the heating rate from 150° C. to 250° C. The base material contained 0.3 mass % of Si, and the thickness of the base material was 0.5 mm. In Sample No. 17, an insulating film was formed using chromate in place of phosphate.

TABLE 1

| | COATING SOLUTION | | | | |
|---|---|---|---|---|---|
| SAMPLE No. | PHOSPHATE | ORGANIC RESIN | CHELATING AGENT | OTHER MATERIAL | TOTAL ION CONCENTRATION (ppm) |
| 1 | ALUMINUM PHOSPHATE | N/A | N/A | N/A | 50 |
| 2 | ALUMINUM PHOSPHATE | ACRYLIC | N/A | N/A | 50 |
| 3 | ALUMINUM PHOSPHATE | ACRYLIC | N/A | N/A | 50 |
| 4 | ALUMINUM PHOSPHATE | ACRYLIC AND*1 | N/A | N/A | 50 |
| 5 | ALUMINUM PHOSPHATE | ACRYLIC | GLUCONIC ACID | N/A | 120 |
| 6 | MAGNESIUM PHOSPHATE | ACRYLIC | OXALIC ACID | N/A | 50 |
| 7 | MAGNESIUM PHOSPHATE | ACRYLIC | PHOSPHONIC ACID | N/A | 50 |
| 8 | ALUMINUM PHOSPHATE AND MAGNESIUM PHOSPHATE | ACRYLIC | CITRIC ACID | N/A | 50 |
| 9 | ALUMINUM PHOSPHATE AND ZINC PHOSPHATE | ACRYLIC STYRENE | CITRIC ACID | N/A | 50 |
| 10 | ALUMINUM PHOSPHATE | N/A | GLUCONIC ACID | N/A | 50 |
| 11 | ALUMINUM PHOSPHATE | ACRYLIC | OXALIC ACID | N/A | 50 |
| 12 | MAGNESIUM PHOSPHATE | ACRYLIC | PHOSPHONIC ACID | N/A | 80 |
| 13 | ZINC PHOSPHATE | ACRYLIC STYRENE | CITRIC ACID | N/A | 50 |
| 14 | ALUMINUM PHOSPHATE AND MAGNESIUM PHOSPHATE | POLYESTER | PHOSPHONIC ACID | N/A | 50 |
| 15 | ALUMINUM PHOSPHATE AND ZINC PHOSPHATE | EPOXY | GLUCONIC ACID | N/A | 50 |
| 16 | ALUMINUM PHOSPHATE | ACRYLIC | PHOSPHONIC ACID | N/A | 50 |
| 17 | (MAGNESIUM CHROMATE) | ACRYLIC | N/A | N/A | 100 |
| 18 | ALUMINUM PHOSPHATE | N/A | GLUCONIC ACID | N/A | 50 |
| 19 | ALUMINUM PHOSPHATE | N/A | GLUCONIC ACID | N/A | 50 |
| 20 | ALUMINUM PHOSPHATE AND MAGNESIUM PHOSPHATE | N/A | GLUCONIC ACID | FLUOROTITANIC ACID | 50 |
| 21 | ALUMINUM PHOSPHATE AND MAGNESIUM PHOSPHATE | N/A | GLUCONIC ACID | FLUOROTITANIC ACID | 100 |

| | APPLICATION CONDITION | | | BAKING CONDITION | | | |
|---|---|---|---|---|---|---|---|
| SAMPLE No. | DIAMETER OF ROLLER (mm) | APPLYING RATE (m/min) | THICKNESS (μm) | FIRST HEATING RATE (° C./sec) | SECOND HEATING RATE (° C./sec) | ACHIEVING TEMPERATURE (° C.) | NOTE |
| 1 | 300 | 80 | 1.0 | 15 | 8 | 300 | COMPARATIVE EXAMPLE |
| 2 | 300 | 80 | 1.0 | 20 | 15 | 300 | COMPARATIVE EXAMPLE |
| 3 | 300 | 80 | 0.5 | 20 | 15 | 300 | COMPARATIVE EXAMPLE |
| 4 | 300 | 80 | 1.0 | 20 | 15 | 300 | COMPARATIVE EXAMPLE |
| 5 | 300 | 80 | 0.5 | 20 | 15 | 300 | COMPARATIVE EXAMPLE |
| 6 | 550 | 80 | 0.5 | 40 | 30 | 300 | COMPARATIVE EXAMPLE |
| 7 | 300 | 50 | 0.5 | 30 | 25 | 300 | COMPARATIVE EXAMPLE |
| 8 | 300 | 80 | 0.5 | 20 | 15 | 190 | COMPARATIVE EXAMPLE |
| 9 | 300 | 80 | 0.5 | 20 | 15 | 360 | COMPARATIVE EXAMPLE |
| 10 | 300 | 80 | 0.5 | 30 | 20 | 300 | INVENTION EXAMPLE |
| 11 | 300 | 80 | 0.5 | 20 | 15 | 300 | INVENTION EXAMPLE |
| 12 | 400 | 80 | 0.5 | 15 | 10 | 300 | INVENTION EXAMPLE |

TABLE 1-continued

| | | | | | | | |
|---|---|---|---|---|---|---|---|
| 13 | 300 | 80 | 0.5 | 10 | 10 | 300 | INVENTION EXAMPLE |
| 14 | 300 | 80 | 0.5 | 20 | 15 | 200 | INVENTION EXAMPLE |
| 15 | 300 | 80 | 0.5 | 20 | 15 | 300 | INVENTION EXAMPLE |
| 16 | 300 | 80 | 0.5 | 20 | 15 | 350 | INVENTION EXAMPLE |
| 17 | 500 | 60 | 0.5 | 12 | 12 | 300 | COMPARATIVE EXAMPLE |
| 18 | 300 | 80 | 0.5 | 8 | 8 | 270 | COMPARATIVE EXAMPLE |
| 19 | 300 | 80 | 0.5 | 8 | 8 | 300 | COMPARATIVE EXAMPLE |
| 20 | 300 | 80 | 0.5 | 8 | 8 | 270 | COMPARATIVE EXAMPLE |
| 21 | 500 | 80 | 0.5 | 8 | 8 | 300 | COMPARATIVE EXAMPLE |

*1: COPOLYMER OF FLUOROETHYLENE AND ETHYLENICALLY UNSATURATED COMPOUND

Then, measurement of the Fe/P molar ratio and evaluation of the rust resistance and the weldability of the insulating film were performed.

In the measurement of the Fe/P molar ratio of the insulating film, first the electrical steel sheet was immersed in a NaOH aqueous solution at a temperature of 80° C. and a concentration of 20 mass % for 30 minutes to dissolve the insulating film in the NaOH aqueous solution. Then, the amounts by mole (mol) of Fe and P contained in the NaOH aqueous solution were determined in quantity by the ICP analysis. Then, the Fe/P molar ratio of the insulating film was calculated from the amounts by mole. The results are listed in Table 2. The underline in Table 2 represents that the numerical value is out of the range of the present invention.

In the evaluation of the rust resistance, a test piece was prepared from each electrical steel sheet, liquid droplets of sodium chloride solutions different in concentration were attached by 0.5 µl to the surface of the test piece and dried, and the test piece was held in an atmosphere with constant temperature and humidity of a temperature of 50° C. and a relative humidity RH of 90% for 48 hours. The concentrations of the sodium chloride solutions were 0.001 mass %, 0.01 mass %, 0.02 mass %, 0.03 mass %, 0.10 mass %, 0.20 mass %, 0.30 mass %, and 1.0 mass %. Thereafter, the presence or absence of rust was observed, and the limit sodium chloride (NaCl) concentration of each test piece was identified. This result is also listed in Table 2.

In the evaluation of the weldability, the welding current was 120 A, a La—W (2.4 mmφ) was used as an electrode, the gap was 1.5 mm, the flow rate of an Ar gas was 6 l/min, and the clamping pressure was 50 kg/cm², welding was performed at various welding speeds. Then, the maximum welding speed at which blow hole was not generated was specified. The result is also listed in Table 2.

TABLE 2

| SAMPLE No. | INSULATING FILM Fe/P MOLAR RATIO | RUST RESISTANCE LIMIT SODIUM CHLORIDE CONCENTRATION (mass %) | WELDABILITY MAXIMUM WELDING SPEED (cm/min) | NOTE |
|---|---|---|---|---|
| 1 | 0.74 | 0.02 | 50 | COMPARATIVE EXAMPLE |
| 2 | 0.75 | 0.02 | 50 | COMPARATIVE EXAMPLE |
| 3 | 0.75 | 0.01 | 100 | COMPARATIVE EXAMPLE |
| 4 | 0.75 | 0.03 | 50 | COMPARATIVE EXAMPLE |
| 5 | 0.70 | 0.02 | 100 | COMPARATIVE EXAMPLE |
| 6 | 0.05 | 0.02 | 100 | COMPARATIVE EXAMPLE |
| 7 | 0.08 | 0.02 | 100 | COMPARATIVE EXAMPLE |
| 8 | 0.08 | 0.02 | 100 | COMPARATIVE EXAMPLE |
| 9 | 0.70 | 0.03 | 100 | COMPARATIVE EXAMPLE |
| 10 | 0.65 | 0.10 | 100 | INVENTION EXAMPLE |
| 11 | 0.60 | 0.20 | 100 | INVENTION EXAMPLE |
| 12 | 0.40 | 0.30 | 100 | INVENTION EXAMPLE |
| 13 | 0.30 | 0.20 | 100 | INVENTION EXAMPLE |
| 14 | 0.10 | 0.10 | 100 | INVENTION EXAMPLE |
| 15 | 0.40 | 0.30 | 100 | INVENTION EXAMPLE |
| 16 | 0.60 | 0.30 | 100 | INVENTION EXAMPLE |
| 17 | — | 0.30 | 100 | COMPARATIVE EXAMPLE |
| 18 | 0.05 | 0.03 | 100 | COMPARATIVE EXAMPLE |
| 19 | 0.04 | 0.03 | 100 | COMPARATIVE EXAMPLE |
| 20 | 0.07 | 0.03 | 100 | COMPARATIVE EXAMPLE |
| 21 | 0.06 | 0.03 | 100 | COMPARATIVE EXAMPLE |

As listed in Table 2, both of a limit sodium chloride concentration of 0.10 mass % or more and a welding speed of 100 cm/min were obtained in Samples No. 10 to No. 16 within the range of the present invention. In other words, good rust resistance and weldability were obtained.

In Samples No. 1 to No. 9 and No. 18 to No. 21, the limit sodium chloride concentration was 0.03 mass % or less or the welding speed was 50 cm/min, because the Fe/P molar ratio was out of the range of more than 0.1 nor more than 0.65. In other words, the rust resistance or the weldability or both of them were low.

INDUSTRIAL APPLICABILITY

The present invention is applicable, for example, in an industry of manufacturing an electrical steel sheet and an industry using the electrical steel sheet.

The invention claimed is:

1. An electrical steel sheet, comprising:
    a base material of electrical steel; and
    an insulating film formed on a surface of the base material,
    wherein the insulating film contains a phosphate of one or more selected from the group consisting of Al, Zn, Mg and Ca,
    wherein a proportion of an amount by mole (mol) of Fe atoms relative to an amount by mole (mol) of P atoms in the insulating film is not less than 0.30 and not more than 0.65, and
    a limit sodium chloride concentration is 0.1 mass % or more,
    wherein the limit sodium chloride concentration represents a maximum concentration of the sodium chloride solution with which the electrical steel sheet does not rust when 0.5 μL liquid droplets of sodium chloride solutions different in concentration are deposited on the surface of the electrical steel sheet having the insulating film and dried, and the electrical steel sheet is held in an atmosphere with constant temperature and humidity of a temperature of 50° C. and a relative humidity of 90% for 48 hours.

2. The electrical steel sheet according to claim 1, wherein the insulating film contains an organic resin.

* * * * *